May 29, 1956  J. B. COX  2,747,623
SAW CHAIN CUTTER
Filed May 26, 1953
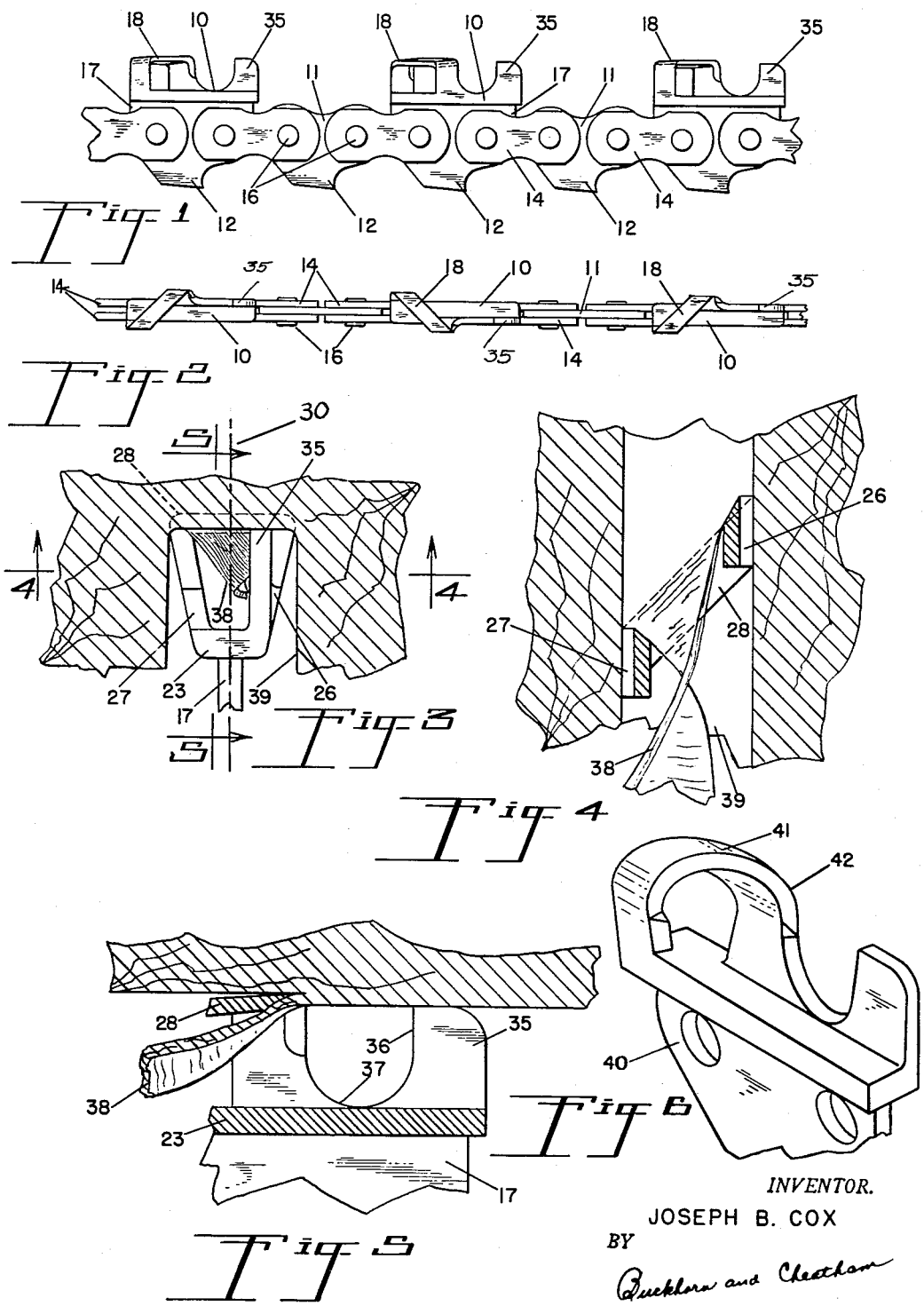
INVENTOR.
JOSEPH B. COX
BY
Bucklora and Cheatham
ATTORNEYS United States Patent Office 2,747,623
Patented May 29, 1956

2,747,623

SAW CHAIN CUTTER

Joseph B. Cox, Portland, Oreg., assignor, by mesne assignments, to Oregon Saw Chain Corp., a corporation of Oregon Application May 26, 1953, Serial No. 357,526

13 Claims. (Cl. 143—135)

The present invention relates to saw chains and, while they are particularly designed for use in cutting wood, it will become apparent as the description proceeds, that the saw chains of the present invention are also adapted for cutting minerals and other materials.

The most common form of saw chains, as used heretofore, are of a type having teeth with a cutting edge adapted to cut only on one side and on the bottom of the kerf, alternate teeth on the chain being adapted to cut the opposite sides of the kerf, so that a wood shaving from the kerf bottom is not completely severed by each individual tooth but is, instead, severed by the cooperative action of a pair of succeeding teeth. As will be apparent, the load on each tooth will necessarily be unbalanced to that side of the tooth which cuts the side wall of the kerf and the tooth will tend to gouge outwardly in the direction of the offset. As a consequence, a saw chain made up of such teeth will be inherently rough or jerky in operation, causing the operation of the saw to be fatiguing upon the operator and also causing rapid wear upon the various parts of the chain and the saw. These disadvantages are overcome with the present invention by providing a full kerf width cutting element.

A primary object of the present invention is to provide a saw chain which has an inherently smooth action, reducing operator fatigue and wear on the chain saw.

Another object of the invention is to provide a new and improved saw chain in which each cutting tooth in itself is completely operative to slice a shaving from the bottom of the kerf.

A further object of the present invention is to provide a cutting tooth of such configuration, that the load thereon is substantially balanced on the opposite sides of the median plane of the tooth.

A still further object of the invention is the provision of a new and improved cutter element for saw chains in which each cutter element severs a shaving from the bottom of the kerf throughout the full width thereof.

Other objects and advantages of the invention will become more apparent hereinafter.

In accordance with an illustrated embodiment, the present invention comprises a U-shaped saw chain cutter tooth element having a pair of spaced-apart kerf side wall cutting edge defining portions and a kerf bottom cutting edge defining portion extending therebetween. The opposite kerf side wall cutting edges are spaced apart longitudinally of the element, and the kerf bottom cutting edge extends therebetween at an oblique angle transversely of the element whereby the element will smoothly slice a shaving from the bottom of a kerf throughout substantially the full width thereof.

For a consideration of what is believed novel and inventive, attention is directed to the following description of certain embodiments taken in connection with the accompanying drawings, while features of novelty will be pointed out in greater particularity in the appended claims.

Referring now to the drawings:

Fig. 1 is a side elevation of a portion of a saw chain constructed in accordance with one form of the present invention;

Fig. 2 is a top plan view of the chain in Fig. 1;

Fig. 3 is an enlarged front elevation of a portion of a saw chain link of the invention illustrating the same in relation to a kerf in a workpiece;

Fig. 4 is a cross-sectional view of a link taken along line 4—4 of Fig. 3;

Fig. 5 is a cross-sectional view taken along line 5—5 of Fig. 3; and

Fig. 6 is a perspective view illustrating a saw chain link according to a modification of the invention.

Referring now to Fig. 1, a saw chain of tthe invention comprises a plurality of centrally disposed, longitudinally spaced-apart alternate cutter links 10 and spacer links 11. The cutter links 10 and spacer links 11 are connected together by means of pairs of intermediate side plates 14 disposed on opposite sides of the links and pivotally secured thereto by means of rivets 16. The spacer links 11 include a sprocket engaging root 12 depending from the lower edge thereof, which portion is adapted to slide within the groove of the saw bar of a chain saw. The cutter links 10 each comprise a body element or portion 17 and a cutter tooth element or portion 18. The body portion 17 also has a sprocket and saw bar groove engaging root 12 depending from the lower edge thereof.

Referring now more particularly to Figs. 3, 4 and 5, the cutter element 18 includes a substantially flat, elongate base portion 23 which extends laterally on each of the opposite sides of the body portion 17 a substantially equal distance. Integral with the opposite side edges of the base 23, and extending upwardly therefrom and slightly diverging symmetrically from the plane of the body portion 17, are a pair of relatively short, laterally spaced-apart kerf side wall cutting edge defining portions or walls 26, 27 which are spaced substantially equidistantly on opposite sides of the longitudinal center line or median plane of the chain indicated at 30 in Fig. 3. Extending between the ends of the cutter side walls 26, 27 and integral therewith, is a kerf bottom cutting end wall 28, the central part of which extends substantially parallel to the base 23, while the opposite corners or side parts thereof form a smooth curved juncture with the respective cutter side walls. A hollow arched or U-shaped cutter link is thus formed which is symmetrically disposed in respect to the median plane of the chain. As more clearly seen in Fig. 4, the cutter side walls 26, 27 are longitudinally spaced apart along the chain so that the leading edge of one of the walls 26 is advanced in respect to the other wall 27. Preferably, the cutter side wall spacing and length is such that the leading side wall 26 is wholly spaced ahead of the forward edge of the other cutter side wall 27 by a distance substantially equal to the length of the side walls, the reason for which will become apparent hereinafter. The leading edge of the cutter end wall 28 extends in a substantially straight line between the leading edges of the side walls 26, 27 and at an oblique angle of about 45 degrees in the direction transversely of the cutter tooth element. Formed integrally with the forward end of the cutter element 18 is a depth gauge 35 offset laterally from the plane of the body portion 17 toward the side of the leading cutter side wall 26 a distance slightly less than the distance of offset of the side walls, the rear edge 36 of the depth gauge 35 being spaced ahead of the forward edge of the leading side wall 26 by the arcuate recess 37.

As viewed most clearly in Fig. 3, it will be observed that, in addition to the end wall 28, only the uppermost portions of the cutter side walls 26, 27 are provided with a cutting edge, which portions extend, however, below the top surface of the depth gauge 35. This configuration will enable a tooth to completely sever a shaving 38 (Figs. 3, 4 and 5) from the bottom of the kerf, but will minimize the length of edge which might gouge into the side of the kerf, thus enhancing the stability of the chain. The cutter elements 18 are alike throughout the chain except that alternate ones are of right and left configuration as may be clearly seen in Figs. 1 and 2.

A saw chain made in accordance with the present invention will operate efficiently inasmuch as each tooth will completely cut or slice a shaving 38 from the bottom of the kerf 39 (Fig. 4) and the effort of the succeeding tooth will be entirely directed to cutting another shaving from the bottom of the kerf. In addition, the load imposed on each tooth will be substantially balanced in respect to the longitudinal center line thereof, and the teeth will tend to proceed in a straight line through the kerf without gouging into the side walls of the kerf, which would cause a useless expenditure of energy in any case, and in some instances might even cause the chain to stall. The slanted cutting edge on the teeth will cause them to cut the wood fibers with a slicing action which may be accomplished with less effort than would be required if the cutting edge were disposed at right angles to the direction of travel of the tooth, in which latter case the severing action would be more in the nature of a wedging operation requiring considerable energy. The longitudinal displacement of the side walls 26, 27 in accordance with the preferred embodiment is of advantage because of the large opening thus provided through which the spiraling chip 38 may pass freely.

In the perspective view of Fig. 6 is illustrated a modified cutter tooth link 40 which may be substituted for the cutter links 10 of the saw chain as previously described. Whereas the cutting edge defining portion 18 of the links 10 is flat across the end, the present cutting edge defining portion 41 is rounded, the arc of the bight of the element being substantially a section of a circle. As in the modification described previously, the leading edge 42 of the cutter element 40 is inclined with respect to the direction of travel of the saw chain and is provided with a sharp, chisel edge.

The cutter elements of the present invention may readily be made economically as by an investment casting process, the only finishing operation required being a slight grinding on the outer surfaces to perfect the cutting edges.

Having illustrated and described preferred embodiments of the invention, it should be apparent to those skilled in the art that the invention permits of further modification in arrangement and detail. I claim as my invention all such modifications as come within the true spirit and scope of the appended claims.

I claim:

1. An elongate saw chain cutter tooth element having a pair of spaced-apart kerf side wall cutting edge defining portions and a kerf bottom cutting edge defining portion joining said side wall cutting edge defining portions, said side wall cutting edge portions being offset with respect to each other in the direction longitudinally of the element.

2. In a saw chain, a plurality of cutter links, each of said cutter links comprising a pair of kerf side wall cutting portions spaced laterally on opposite sides of the median plane of said chain a substantially equal distance, the leading edges of said side wall cutting portions being spaced apart longitudinally of said chain, and a kerf bottom cutting portion extending between said kerf side wall cutting portions.

3. A saw chain comprising a plurality of cutter links as set forth in claim 2 wherein alternate cutter links are of right and left configuration.

4. A saw chain cutter tooth element according to claim 1 in which the cutting edge of said kerf bottom cutting edge defining portion extends at an oblique angle in the direction transversely of the element.

5. A saw chain cutter tooth element according to claim 1 in which the outer surfaces of all of said portions are flat.

6. A saw chain cutter tooth element according to claim 1 in which the side wall cutting edge portions diverge with respect to each other in the direction toward said kerf bottom cutting edge defining portion.

7. In a saw chain, a link comprising a pair of longitudinally spaced-apart kerf side wall cutting portions and a kerf bottom cutting portion integral therewith, said kerf side wall cutting portions being disposed on opposite sides of the longitudinal median plane of said saw chain and diverging symmetrically therefrom toward said kerf bottom cutting portion.

8. In a saw chain, a cutter tooth element comprising a pair of kerf side wall cutting edge defining portions spaced apart longitudinally of the chain and a kerf bottom cutting edge defining portion integral therewith, said kerf side wall cutting edge defining portions being symmetrically disposed on opposite sides of the longitudinal median plane of said saw chain and diverging therefrom towards said kerf bottom cutting edge defining portion, the central part of said kerf bottom cutting edge defining portion lying in a plane normal to the longitudinal median plane of said saw chain, the opposite side parts of said kerf bottom cutting edge defining portion being curved to the juncture thereof with said side wall cutting edge defining portions.

9. An elongate saw chain cutter tooth element comprising a pair of laterally and longitudinally spaced-apart kerf side wall cutting edge defining portions and a kerf bottom cutting edge defining portion integral therewith, said kerf side wall cutting edge defining portions being symmetrically disposed on opposite sides of the longitudinal median plane of said element, the opposite side parts of said kerf bottom cutting edge defining portion being curved to the juncture thereof with said kerf side wall cutting edge defining portions to form a hollow, arched element, the cutting edge of said kerf bottom cutting edge defining portion extending at an oblique angle in a direction transversely of the element.

10. A saw chain link including a body portion having a planar saw groove engaging root and a cutter tooth element having a planar base portion extending substantially equal distances laterally on the opposite sides of said root, said cutter tooth element including a portion substantially U-shaped in cross-section to provide legs terminating at the sides of said base portion, the leading and trailing edges of said U-shaped portion being substantially parallel and extending at an oblique angle the median plane of said chain so as to space said legs longitudinally along said base portion, said leading edge having a sharp chisel cutting edge formed thereon, the foremost of said legs being spaced wholly forwardly of the trailing leg whereby to provide a large opening through which severed chips may pass.

11. In a saw chain, a link including a cutter tooth element having a planar base extending substantially equal distances laterally on the opposite sides of the longitudinal central median plane of said chain, said cutter tooth element including a portion substantially U-shaped in cross-section to provide legs terminating at the sides of said base, the arc of the bight of said portion being substantially a section of a circle, the leading and trailing edges of said portion being inclined obliquely said median plane so as to space said legs longitudinally along said base, said leading edge having a sharp chisel cutting edge thereon, the foremost of said legs being spaced wholly forwardly of the trailing leg whereby to provide a large opening through which severed chips may pass.

12. In a saw chain, a hollow cutter link comprising a pair of laterally and longitudinally spaced-apart kerf side wall cutting portions and a kerf bottom cutting portion integral therewith, said kerf side wall cutting portions being symmetrically disposed on opposite sides of the longitudinal plane of said saw chain, and a depth gauge integral with the leading end of said link, said depth gauge being offset laterally from said longitudinal plane on the side of the foremost side wall cutting portion a distance slightly less than the longitudinal spacing of said side wall cutting portions.

13. In a saw chain, a link including a cutter tooth element having a planar base extending substantially equal distance laterally on opposite sides of the longitudinal median plane of said chain, said tooth element including a portion substantially U-shaped in cross-section to provide legs terminating at the sides of said base, the leading edge of said portion being inclined with respect to said median plane so as to space said legs longitudinally along said base, said leading edge having a sharp chisel cutting edge thereon, and a depth gauge integral with the leading end of said link, said depth gauge being offset laterally from said medium plane on the side of the foremost leg a distance slightly less than the longitudinal spacing of said legs.

References Cited in the file of this patent

UNITED STATES PATENTS

| | | |
|---|---|---|
| 2,508,784 | Cox | May 23, 1950 |
| 2,534,591 | Geurian | Dec. 19, 1950 |
| 2,558,678 | Garrett | June 26, 1951 |
| 2,622,636 | Cox | Dec. 23, 1952 |
| 2,655,958 | Gommel | Oct. 20, 1953 |